Figure 1:
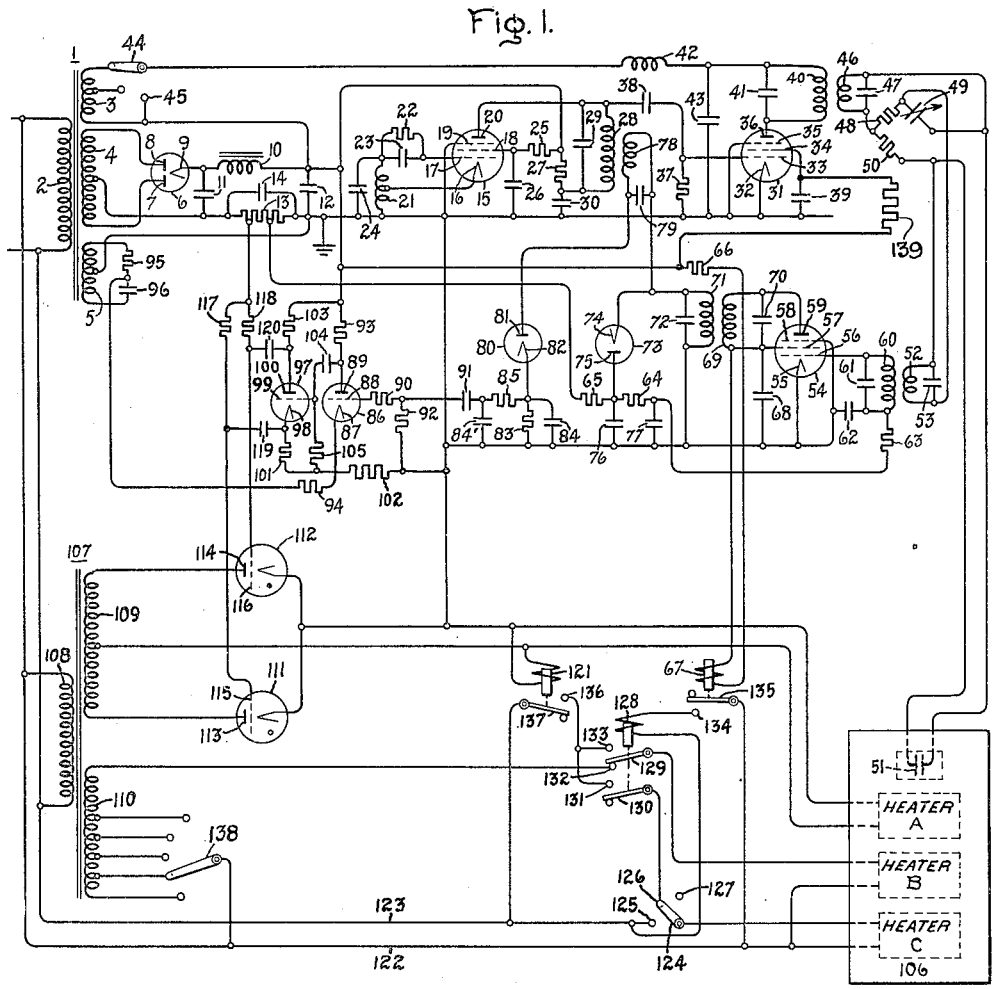

Inventors:
Philip C. Michel,
Theodore A. Rich,
by Browell S. Mack
Their Attorney.

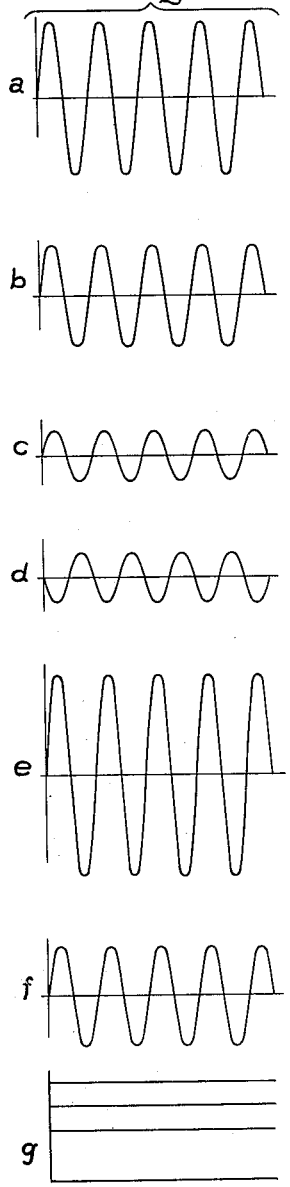
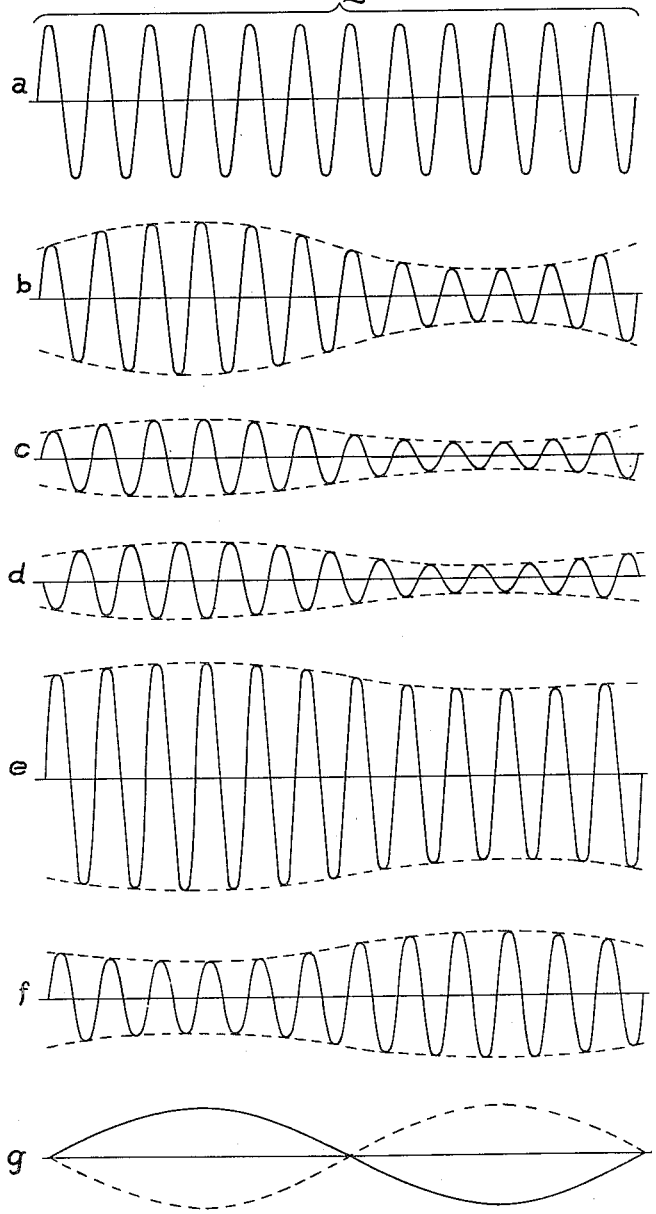

Patented Apr. 25, 1950

2,505,565

UNITED STATES PATENT OFFICE 2,505,565

CONTROL CIRCUIT

Philip C. Michel and Theodore A. Rich, Schenectady, N. Y., assignors to General Electric Company, a corporation of New York Application November 14, 1946, Serial No. 709,738

2 Claims. (Cl. 219—20)

Our invention relates to control circuits and more particularly to a new and improved control circuit utilizing a radio frequency bridge circuit in such fashion that not only the degree of unbalance but also the direction of unbalance causes the control elements to operate in a manner whereby accelerated action is accomplished without introducing hunting.

Control circuits employing bridge circuits which utilize an A. C. source of the same frequency as the source from which the device to be controlled is energized have been used previously with success. However, the accuracy with which they may be made to operate is subject to the effects of stray fields or magnetic linkages between the energizing circuit of the load apparatus and the control circuits. Where accurate control is desired these effects must be minimized which is not possible in most cases without utilizing extensive shielding which itself is otherwise a disadvantage. Control circuits employing radio frequency bridge circuits are also used and since they operate at a frequency far different from that of the source energizing the load equipment electromagnetic or electrostatic shielding is no longer a factor in determining accuracy. However, the usual type of circuit utilizing a radio frequency bridge circuit usually is sensitive only to unbalance of the bridge circuit and auxiliary methods must be employed to determine the direction of unbalance. It is desirable that a circuit be devised to operate in conjunction with a radio frequency bridge in such fashion that control is exercised upon the load circuit in a manner dependent not only upon the degree of unbalance but also upon the direction of unbalance.

It is an object of our invention to provide a new and improved control circuit utilizing a radio frequency bridge circuit which produces an output dependent upon both the degree of unbalance and the direction of unbalance of the radio frequency bridge circuit.

It is another object of our invention to provide a new and improved control circuit for a constant temperature oil bath wherein the desired temperature is quickly reached and restored while preventing objectional hunting or overcompensation.

It is a further object of our invention to provide a new and improved control circuit employing a radio frequency bridge circuit whose output is a low frequency voltage whose amplitude is dependent upon the degree of unbalance of the radio frequency bridge and whose phase relationship with respect to a low frequency source voltage is dependent upon the direction of such unbalance.

It is a still further object of our invention to provide a new and improved control circuit employing a radio frequency bridge circuit whose output is a D. C. voltage comprising a component of fixed amplitude and polarity and a component whose amplitude is dependent upon the degree of unbalance and whose polarity is dependent upon the direction of unbalance of the radio frequency bridge circuit.

The features of the invention which are believed to be novel and patentable will be pointed out in the claims appended hereto. For a better understanding of the invention, reference is made in the following description to the accompanying drawing in which Fig. 1 discloses a control circuit for regulating the temperature of an electrically heated oil bath; Fig. 2 presents curves of voltages existing in portions of the circuit of Fig. 1 when unmodulated radio frequency voltages are utilized, and Fig. 3 presents similar curves for the case when amplitude modulated radio frequency voltages are utilized.

In general, the circuit of Fig. 1 discloses a power supply, as shown in the upper left-hand portion of the figure, an essentially constant amplitude, constant frequency oscillator including tube 15 and associated elements, an amplitude modulating stage utilizing tube 31, and an alternating current bridge supplied with amplitude modulated radio frequency voltage. The bridge supplies an output voltage of a magnitude and phase relationship with respect to the impressed radio frequency voltage dependent upon the degree and direction of unbalance of the bridge. This voltage is amplified by tube 54 whose associated elements, including tube 73, cause it to possess automatic volume control features.

The amplified output of tube 73 is added to a constant amplitude radio frequency voltage derived from the radio frequency oscillator, and the resultant voltage is rectified by tube 80. This rectified voltage is, in turn, utilized to control a phase discriminatory circuit comprising tubes 86 and 97 which, in turn, operate by phase control on tubes 111 and 112 to regulate current flow in the circuit to a heater A. Additional heaters may be controlled by relays actuated by current flow to heater A, which current flow is dependent upon both the degree and the direction of bridge unbalance in combination with relays actuated by the degree of bridge unbalance only, as evidenced in the amplifier circuit including tube 54. Thus, the described control circuit is capable of imposing conditions dependent upon both the degree and the direction of unbalance.

In Fig. 1, the control circuit is supplied from an A. C. power source which may also be the source for the electrical heating elements of the oil bath or other load to be controlled. This source energizes a transformer 1 by proper connections to a primary coil 2 of transformer 1. Transformer 1 is provided with at least three tapped secondary coils 3, 4 and 5 and may also possess an additional secondary coil, not shown, for supplying voltage to the cathode heaters of the various tubes utilized.

A. D. C. anode voltage source is provided in a customary manner by utilizing the center tapped secondary coil 4 and a double anode full wave rectifier tube 6 whose anodes 7 and 8 are connected to the respective ends of secondary coil 4. Cathode 9 thereby is maintained positive with respect to the center tap of secondary coil 4 and a filter circuit consisting of an inductance or choke coil 10 and condensers 11 and 12 is utilized to filter out the cathode pulsations by connecting cathode 9 to one side of a choke coil 10 and connecting condenser 11 between cathode 9 and the center tap of secondary coil 4 and connecting condenser 12 from the other end of coil 10 to ground. The center tap of secondary coil 4 is in turn connected to ground through a tapped resistor 13 which is shunted by a radio frequency by-pass condenser 14. It will be evident to those skilled in the art that this part of the circuit is a conventional D. C. power supply comprising a full-wave rectifier and filter, and that other power supplies capable of providing the required D. C. voltages and currents may be substituted without changing the operating principles of our invention.

A normally conducting pentode oscillator tube 15 has its cathode 16 connected to an appropriate tap on an inductance coil 21 and its control grid 17 connected to one end of coil 21 through a grid resistor 22 which is shunted by a condenser 23. Coil 21 is connected to ground at the other end and is shunted by a fixed tuning condenser 24. Positive voltage from tube 6 is impressed upon the screen grid 18 of tube 15 through a resistor 25 and a radio frequency by-pass to ground is provided by a condenser 26. Suppressor grid 19 is connected to ground while anode 20 is connected to the positive potential supplied by tube 6 through the serially connected resistor 27 and a tuned circuit consisting of an inductance coil 28 shunted by a tuning condenser 29. The anode side of resistor 27 is effectively connected to ground with respect to radio frequency currents by means of a by-pass condenser 30. Tube 15 and its associated elements constitute a radio frequency oscillator circuit whose frequency is principally dependent upon the LC constants of coils 21 and 28 and condensers 24 and 29 and may be caused to oscillate at a desired frequency by proper choice of these constants. The oscillator circuit described is an electron-coupled Hartley oscillator, but other oscillator circuits known in the art will also give good results.

The radio frequency voltage output of tube 15 is amplified and amplitude modulated by a normally conducting tube 31 whose cathode 32 is maintained at ground potential as is also its suppressor grid 35. Control grid 33 connected to ground through a grid resistor 37 is capacitively coupled to the anode 20 of tube 15 by means of a coupling condenser 38. Screen grid 34 is held at a positive potential by connection to the D. C. power supply through resistor 139. A radio-frequency by-pass capacitor 39 is provided to prevent radio-frequency variations in the potential of screen grid 34. Anode 36 is connected to one side of a tuned radio frequency circuit consisting of an inductance coil 40 shunted by a condenser 41 and is supplied with a voltage having both D. C. and A. C. components by connecting the other side of the tuned circuit to the positive voltage of tube 6 through the secondary coil 3 of transformer 1. A radio frequency choke coil 42 is inserted between coil 3 and the tuned circuit 40 and 41 which in cooperation with a condenser 43 connected between the tuned circuit side of coil 42 and ground prevents the radio frequency oscillations of coil 40 from causing radio frequency voltages across the secondary 3 of transformer 1. Thus the radio frequency voltage of coil 40 is modulated in amplitude by the voltage of secondary coil 3 of transformer 1 at power source frequency. The degree of modulation may be controlled by manipulation of a switch 44 or may be made zero by causing switch 44 to contact terminal 45. This part of the circuit is a plate-modulated radio-frequency amplifier stage. Stages employing other forms of amplitude modulation may be substituted with good results.

An alternating-current bridge circuit is energized by the amplitude modulated radio frequency voltage output of tube 31 which is made available across an inductance coil 46 by virtue of its inductive coupling to coil 40. A condenser 47 connected across coil 46 is employed to tune coil 46 to the frequency of coil 40. Coil 46 is connected across the bridge in such fashion that radio frequency voltage is impressed across a serially connected resistor 48 and manually adjustable condenser 49 and also across a serially connected resistor 50 and temperature responsive condenser 51. A voltage caused by bridge unbalance exists between the junction of resistor 48 and condenser 49 and the junction of resistor 50 and condenser 51. The tuned circuit consisting of an inductance coil 52 shunted by a condenser 53 is subjected to the unbalance voltage of the bridge by proper connections thereto.

A normally conducting tube 54 whose cathode 55 and suppressor grid 58 are maintained at ground potential operates as a radio frequency amplifier subject to the automatic gain control features introduced by a tube 73 as will be described. Control grid 56 is connected to one side of an inductance coil 60 which is shunted and tuned by a condenser 61. Coil 60 is inductively coupled to coil 52. The other end of coil 60 is capacitively coupled to ground through a condenser 62 and is normally maintained at a negative potential with respect to ground by its connection to an appropriate tap on resistor 13 through serially connected resistors 63, 64, and 65. The positive potential at tube 6 is supplied to screen grid 57 of tube 54 through a resistor 66 and the electromagnetic coil of a relay 67 connected in series. Screen grid 57 is also capacitively coupled to ground by a radio frequency by-pass condenser 68. Anode 59 of tube 54 is connected to screen grid 57 through a tuned circuit consisting of a coil 69 shunted by a tuning condenser 70. The output of tube 54 is made available across an inductance coil 71 inductively coupled to coil 69. Coil 71 is tuned to the proper radio frequency by a tuning condenser 72 which is connected across coil 71.

A diode rectifier or grid biasing tube 73 is connected in such fashion that the grid bias voltage of tube 54 increases negatively with an amplitude increase of the output of tube 54 thereby decreasing its amplification factor for large input to its control grid. One side of coil 71 is grounded and the other side is connected to cathode 74 of tube 73. Anode 75 of tube 73 is connected to the junction of resistors 65 and 64 and also is capacitively connected to ground by a condenser 76. Condenser 76 has sufficient capacity with respect to the resistance value of resistor 65 plus a portion of resistor 13 which in series constitutes a discharge path for condenser 76 in order to maintain an essentially constant negative D. C. voltage on anode 75 of tube 73. Additional capacity to ground is supplied by condenser 77 coupled between ground and the junction of resistors 64 and 63. It should be noted that tube 73 does not conduct until the R. F. voltage applied thereto exceeds the D. C. bias provided by a portion of resistor 13. Tube 73 thus provides a delayed automatic-gain-control action to amplifier tube 54. Other amplifier circuits having automatic-gain-control features may also be employed.

A radio frequency voltage of essentially constant amplitude derived from the oscillator tube 15 is added to the output radio frequency voltage of tube 54 by connecting one side of a coil 78 to the ungrounded side of coil 71. Coil 78 is inductively coupled to coil 28 and is tuned to the proper radio frequency by a shunting condenser 79.

The algebraic sum of the voltages of coils 71 and 78 is impressed across a diode rectifier tube 80 by connecting the anode 81 of tube 80 to one side of coil 78, the other side of which is connected to the ungrounded side of coil 71, and by connecting cathode 82 of tube 80 to ground through a resistor 83 shunted by a condenser 84. Resistor 83 is also shunted by a condenser 84' and a resistor 85 in series and the voltage across condenser 84' thereby contains a smaller radio frequency component than does resistor 83 or condenser 84. Tube 80 acts as a detector or demodulator.

When an amplitude modulated radio frequency input is impressed upon the bridge circuit of resistors 48 and 50 and condensers 49 and 51 a source frequency A. C. voltage appears across condenser 84' whenever the bridge is unbalanced and this voltage is either in phase or 180° out of phase with the source voltage depending upon the direction of unbalance on the bridge.

A normally conducting tube 86 with a cathode 87, grid 88 and anode 89 is employed as a mixer or voltage adder wherein a resultant voltage is obtained the phase of which is dependent upon the relative magnitude of two A. C. voltages of the same frequency but displaced 90° in phase with respect to each other. Control grid 88 of tube 86 is capacitively coupled through a resistor 90 to the ungrounded side of condenser 84' by means of a condenser 91. Grid 88 is also connected to ground through resistor 90 by means of a resistor 92. Anode 89 of tube 86 is connected to the positive potential available at tube 6 through a resistor 93. Cathode 87 through a resistor 94 is subjected to an A. C. voltage with respect to ground by a connection to the junction of a resistor 95 and a condenser 96 which elements are connected in series across the terminals of the secondary coil 5 of transformer 1. The center tap of winding 5 is grounded. Resistor 95 and condenser 96 operate as a phase shifter which is designed to shift the phase by substantially 90° for reasons to be explained.

A normally conducting tube 97 with a cathode 98, a control grid 99, and an anode 100 is employed in a circuit from which two A. C. voltages of equal amplitude but 180° out of phase with each other may be obtained. Thus tube 97 is an inverter used to obtain a push-pull output.

Cathode 98 is connected to ground through two serially connected resistors 101 and 102 while anode 100 of tube 97 is connected to the plate voltage supply through resistor 103. Control grid 99 of tube 97 is capacitively coupled to anode 89 of tube 86 by means of a condenser 104 and is connected to ground through two serially connected resistors 105 and 102.

The circuit just described may be employed to control the temperature in an oil bath 106 by placing the temperature responsive condenser 51 therein and by supplying heat energy thereto by means of electrical heating units A, B, and C. These may be energized from the same A. C. power source as employed for transformer 1, either through a transformer 107 or directly at least in part. Primary winding 108 of transformer 107 is energized from the A. C. source while the tapped secondary coils 109 and 110 are utilized in a manner to be described.

The center tap of a secondary winding 109 is connected directly to a terminal of an electric heating unit such as heater A which is preferably of smaller heat producing capacity than any of the other heating units in oil bath 106. The other terminal of heater A is connected to the cathodes of two grid controlled mercury vapor discharge tubes 111 and 112 and to ground. Anodes 113 and 114 of tubes 111 and 112 respectively are connected to respective end terminals of secondary coil 109 of transformer 107. The control grids 115 and 116 of tubes 111 and 112 respectively obtain a normally negative bias by connecting each to the same appropriate tap on resistor 13 through their respective grid resistors 117 and 118. Control grid 115 is, in addition, capacitively coupled to cathode 98 of tube 97 by a condenser 119 and similarly grid 116 is capacitively coupled to anode 100 of tube 97 by a condenser 120. The electromagnet winding of a relay 121 is connected across heater A and in parallel with it.

A lead 122 from one terminal of the A. C. power source extends directly to one terminal of an electrical heating unit such as heater C which may be preferably the unit possessing the greatest heat producing capacity. A lead 123 extends from the other terminal of the A. C. power source to a contact point 125 of a three position manually operated switch 124. The arm of switch 124 may be made to contact any one of three contacts 125, 126, and 127. The remaining terminal of heater C is connected to the contact arm of switch 124.

The electromagnet coil of a relay 128 is connected between lead 123 and contact point 134 of relay 67 and contact arm 135 of relay 67 is connected to lead 122 thereby enabling relay 128 to be actuated by the A. C. power source when the electromagnet coil of relay 67 is sufficiently deenergized to allow its plunger to fall. Heater B is connected between lead 122 and contact arm 129 of relay 128 which arm may contact either contact point 132 or 133. Contact arm 130 of relay 128 is connected to contact point 129 of the manually operated switch 124. Arm 130 will contact point 131 when relay 128 is energized. Contacts 131 and 133 of relay 128 and contact 136 of relay 121 are all connected together and contact arm 137 of relay 121 is connected to power lead 123. That portion of secondary coil 119 of transformer 107 chosen by adjustment of a manually operated switch 138 is connected between lead 122 and contact point 132 of relay 128.

The operation of the control circuit in automatically maintaining the oil bath temperature constant may be described in the following manner. D. C. voltage requirements of the circuit are met employing a rectifier tube 6 and its associated elements in cooperation with secondary coil 4 of transformer 1 whereby the ungrounded terminal of condenser 12 may be considered a source of D. C. anode voltage and the voltage drop through resistor 13 causes its ungrounded end to become negative thereby allowing tapping of resistor 13 for obtaining appropriate negative grid biasing voltages.

Tube 15 and its associated elements constitute an electron-coupled Hartley type radio frequency oscillator which by design may be made to oscillate at the desired radio frequency. Tube 15 will cause oscillations of essentially constant amplitude affected only negligibly by the temperature characteristics of the tube and its associated elements. In the circuit including tube 31, the constant amplitude radio frequency voltage output of tube 15 is amplified and amplitude modulated at A. C. source frequency by imposing an A. C. component of voltage upon anode 36 of tube 31 by means of the secondary coil 3 of transformer 1 in series with the D. C. supply lead to anode 36. The degree of amplitude modulation may be manually adjusted by proper positioning of switch 44 and in fact may be entirely eliminated by turning switch 44 to contact point 45.

The radio frequency output voltage of tube 31 as illustrated by curve $b$ of Fig. 2 for unmodulated and curve $b$ of Fig. 3 for modulated radio frequency voltage is made available across the coil 46 which is inductively coupled to coil 40 in the anode circuit of tube 31. This voltage is impressed across a resistance-capacitance type alternating current bridge, one branch of which contains a resistor 48 and a manually adjustable condenser 49 and the other branch of which contains a resistor 50, either equal to or some desired proportion of resistor 48, and a condenser 51 of such a characteristic that its value is dependent upon its temperature. When the bridge is balanced, the voltage across the terminals separated by resistors 48 and 50 in series and by condensers 49 and 51 in series is zero. If an unbalance occurs, as by a change in the value of condenser 51 because of temperature change, a voltage exists between the above mentioned terminals which voltage is either substantially in phase with or substantially 180° out of phase with the voltage impressed upon the bridge. This voltage depends upon direction of unbalance for phase determination and upon the degree of unbalance for its amplitude. This is illustrated by curve $c$ of Fig. 2 or 3 for one direction of bridge unbalance, and by curve $d$ of Fig. 2 or 3 for the opposite direction of bridge unbalance. It is preferable that condenser 49 present a reactance at the radio frequency of the voltage of coil 46 which is essentially equal to the resistance of resistor 48 and a like relationship should exist between resistor 50 and condenser 51 in order to insure that the substantially in-phase or substantially 180° out-of-phase relationship described may exist even for relatively large unbalance of the bridge. Bridge circuits containing other types of impedances such as resistances, inductances or capacitances or combinations thereof may also be used with the control circuit described herein.

The radio frequency voltage caused by unbalance of the bridge circuit is impressed upon the control grid circuit of the amplifier tube 54. The control grid 56 of tube 54 is normally biased negatively to an extent dependent upon the positioning of the tap on resistor 13. This condition exists at zero input signal voltage or at such time when the bridge circuit is balanced. At normal bias the D. C. anode current of tube 54 is of sufficient size to cause the electromagnet coil of relay 67 to attract and hold the magnetic plunger and its associated contact arm in the energized position, as shown in the figure, such that arm 135 remains separated from contact point 134. When the bridge circuit becomes unbalanced in either direction a radio frequency voltage appears across coils 52 and 60 and by amplifier action of tube 54 similarly across coils 69 and 71. If the amplitude of the radio frequency voltage in coil 71 exceeds the normal bias voltage the diode rectifier tube 73 causes condenser 76 to become more negatively charged than previously thereby increasing the negative bias on tube 54.

The increase in negative bias of tube 54 not only decreases the effective amplification of tube 54, since tube 73 operates as an automatic volume control for tube 54, but in addition the D. C. anode current drawn by tube 54, which flows through the electromagnet coil of relay 67, is also decreased. Relay 67 is preferably of such characteristic that its plunger is released by the electromagnet coil thereby allowing arm 135 to contact point 134 at a predetermined current value equal to the value to which the anode current of tube 54 is decreased by action of tube 73 for a chosen degree of unabalance of the bridge circuit.

The operation of the circuit consisting of the serially connected coils 78 and 71 connected across tube 80 and its cathode resistor 83 which is shunted by condenser 84 may be explained in the following manner. A constant amplitube radio frequency voltage illustrated by curve $a$ of Fig. 2 or Fig. 3 exists across coil 78 because of its inductive relationship to the tuned plate circuit coil 28 of oscillator tube 15. The amplitude of this voltage is made sufficiently large so as to exceed the voltage induced in coil 71 for even the greatest contemplated degree of unbalance in the bridge circuit. By serially connecting coils 78 and 71 the voltage of coil 71 is added algebraically to the voltage of coil 78. The voltages in coils 78 and 71 are at identical frequencies and are either in phase or are 180° out of phase with each other. Thus for an unmodulated voltage across coil 71 the voltage across the coils in series will possess a constant amplitude exceeding the voltage of coil 78 if the bridge unbalance is in such direction as to cause the voltage of coil 71 to be in phase with the voltage of coil 78 and the amount of such excess will be dependent upon the degree of unbalance of the bridge circuit. This condition is illustrated by curve E of Fig. 2. Similarly, unbalance in the opposite direction causes the voltage across the coils in series to possess a constant amplitude less than the voltage of coil 78 to an extent dependent upon the degree of unbalance as illustrated by curve $f$ of Fig. 2. By rectifying action of diode tube 80 the resultant voltage will appear as a D. C. voltage across condenser 84 and resistor 83 in parallel whose value is equal to the amplitude of the resultant radio frequency voltage. Thus condenser 84 will be normally charged to a D. C. value equal to the amplitude of the voltage of coil 70 and will become charged to a higher value during unbalance in one direction or charged to a lower value for unbalance in the opposite direction as illustrated by curve g of Fig. 2.

When the output voltage appearing across coil 71 is an amplitude modulated radio frequency wave, similar conditions as to a resultant voltage across coils 71 and 78 in series apply as before. Thus, curve e of Fig. 3 illustrates unbalance in one direction and curve f of Fig. 3 unbalance in the opposite direction. The resultant voltage, however, will be an amplitude modulated wave thereby causing the voltage across condenser 84 to possess a fixed D. C. component plus an A. C. component at power source frequency whose amplitude is dependent upon the degree of unbalance of the bridge circuit. Further, since the instantaneous voltage of coil 71 is of the same polarity as that of the instantaneous voltage of coil 78 during the total radio frequency cycle and all such cycles when the bridge circuit is unbalanced in one direction and similarly of opposite polarity when the bridge circuit is unbalanced in the opposite direction, whether the voltage of coil 71 is amplitude modulated or not, it can be shown that the A. C. component at power source frequency appearing across condenser 84 is in phase with the A. C. power source reference voltage when the bridge circuit is unbalanced in one direction, as illustrated by solid line curve of Fig. 3g, and is 180° out of phase with such reference voltage when the bridge circuit is unbalanced in the opposite direction, as illustrated by the dotted line curve of Fig. 3g. Since condenser 91 will charge up to the average D. C. voltage value of condenser 84' whose charge is essentially equivalent to condenser 84, only the A. C. component of voltage on condenser 84' or of 84 will appear across resistor 92.

The normally conducting triode tube 86 and its associated elements constitute an automatic phase shifting device designed in such fashion that the A. C. output voltage of anode 89 leads or lags a reference voltage such as the A. C. power source voltage to an extent dependent upon the amplitude and phase relationship of the A. C. output voltage of tube 86 or its equivalent, the voltage of condenser 84'. With no A. C. voltage across condenser 84', tube 86 operates in such manner as to supply an A. C. voltage to grid 99 of tube 97 essentially 90° behind the A. C. power source reference voltage. When the bridge circuit is unbalanced because the temperature of the oil bath is low an A. C. voltage appears across resistor 92 and tube 86 causes the A. C. voltage on grid 99 of tube 97 to be less than 90° behind the A. C. power source reference voltage. If the bridge circuit is unbalanced in the opposite direction, as for example by excessive temperature in the oil bath, the A. C. voltage of grid 99 of tube 97 is caused by action of tube 86 to be more than 90° behind the reference voltage.

Normally conducting tube 97 is employed in a circuit such that the voltage of cathode 98 follows the A. C. control grid voltage on grid 99 by cathode follower action and is in phase with it while the voltage of anode 100 has an A. C. component equal to but 180° out of phase with the A. C. variation in voltage of cathode 98. This equality of amplitude is accomplished by using a value of resistance for resistor 103 equal to the sum of resistors 101 and 102.

When an A. C. power source is applied to transformer 107, a pulsating unidirectional current is supplied to heating unit A through the mercury vapor discharge tubes 111 and 112. The average value of this current and therefore the average voltage across heater A may be regulated by exercising proper grid control on tubes 111 and 112. In normal operation when the bridge circuit of the control device is balanced, each control grid is subjected to a proper negative D. C. bias and to an A. C. voltage which lags by essentially 90° the A. C. voltage on their respective anodes thereby causing each tube to be conductive alternately during essentially one-half the interval of each cycle when its respective anode is positive. If the bridge becomes unbalanced as by a low temperature in the oil bath, the phase of each grid will be advanced so that each tube becomes conductive during a longer interval of each cycle thereby increasing the current to and voltage across heater A. Conversely, a bridge unbalance caused by excessive temperature in the oil bath decreases the time interval in each cycle during which tubes 111 and 112 are conductive thereby decreasing current flow to and the voltage across heater A. Thus the heating rate of heater A is controlled by temperature changes in the oil bath. In addition, relay 121 is designed to remain unactuated when the current flow to heater A corresponds to bridge balance but is actuated or closed when the current flow to heater A exceeds the value at bridge balance by a predetermined amount.

At bridge balance, relays 67, 121, and 128 are in the position shown on the drawing and switch 124 is preferably in the position shown. Contact arm 129 is in contact with point 132 and heater B is being energized by coil 110 of transformer 107 to an extent manually controlled by the position of switch 138. It is desirable to adjust switch 138 so that normal conduction and radiation heat losses from the oil bath are essentially balanced by heat energy supplied at bridge balance by heaters A and B.

If the bridge circuit becomes unbalanced in either direction to a predetermined amount, relay 67 drops out and arm 135 contacts point 134 since at unbalance the D. C. anode current of tube 54 is decreased by the increase in negative bias on tube 54 as caused by action of tube 73. Relay 128 is thereby energized by the A. C. power source and arm 129 contacts point 133 and arm 130 contacts point 131.

If the unbalance which caused relay 67 to drop out is caused by excessive temperature, the current supplied to heater A is decreased as explained previously and relay 121 remains unenergized. Thus heaters B and C are deenergized and heater A is supplying heat energy at a below normal rate. If, however, the unbalance causing relay 67 to drop out is caused by low oil bath temperature the current to heater A is above normal and relay 121 is energized sufficiently to operate thereby effectively connecting points 131 and 133 to lead 123. Therefore, for low temperatures heater A produces heat at an above normal rate and both heaters B and C produce heat at their maximum rate since each is connected directly across the A. C. power source.

Among the advantages of the control and energizing circuit herein disclosed the principal advantage in addition to its freedom from power source frequency inductive interference effects is that the proper desired temperature may be reached quickly without overshooting or hunting. At an excessive temperature heaters B and C are deenergized and heater A produces heat at a below normal rate. As the desired temperature is approached but before it is reached relay 67 is actuated and heater B again supplies heat at a rate dependent upon the adjustment of switch 138 thereby decreasing the rate at which the temperature decreases to the desired value. Further, at a low temperature heaters B and C supply heat energy at a maximum rate and heater A is operating at above normal rate. As the desired temperature is approached but before it is reached relay 67 is actuated thereby deenergizing relay 128 and heater C is deenergized and heater B is transferred from source voltage to the chosen lower voltage of coil 119 and the rate at which the temperature increases toward the desired value is materially decreased.

In some cases it may be unnecessary to employ heater C at all. This may be done by setting switch arm 124 on contact 127. When this is done heater C is effectively removed from consideration and the desired temperature is approached while warming up at a slower rate which may be preferable in some instances.

As will occur to those skilled in the art, various different arrangements and combinations of the principles described above may be employed without departing from the true spirit and scope of the invention and we therefore do not wish to limit our invention to the particular arrangement described.

What we claim as new and desire to secure by Letters Patent of the United States is:

1. A control circuit for a constant temperature electrically heated device comprising an A. C. source, oscillator means for generating radio frequency oscillations adapted to be energized from said source, a temperature responsive alternating current bridge circuit adapted to be affected by the temperature of said heating device, first circuit means for energizing said bridge from said oscillator means, second circuit means adapted to be energized from said oscillator means and responsive to the output voltage of said bridge for producing an output current whose value decreases as said bridge becomes unbalanced and for producing a voltage dependent in magnitude upon both the degree and direction of unbalance of said bridge, a plurality of electrical heating elements, third circuit means including grid controlled vapor discharge tubes adapted to energize a portion of said heating elements from said A. C. source to an extent dependent upon the voltage produced by said second circuit means, a first relay, a second relay, means adapted to energize said first relay from said A. C. source when said second relay is sufficiently deenergized, means adapted to energize said second relay by the output current produced by said second circuit means, said output current being insufficient to actuate said second relay when said bridge is unbalanced by a predetermined amount, a third relay adapted to be energized to open position by said third circuit means when said bridge is unbalanced a predetermined amount because of excessive temperatures, means including said relays adapted to energize a second portion of said heating elements from said A. C. source at one heat-producing rate for temperatures within a predetermined range of temperatures on each side of bridge balance and at a higher rate for temperatures below said predetermined range and deenergizing said second portion for temperatures above said predetermined range, and means including said relays adapted to energize the remaining portion of said heating elements only when the temperature of said device is below said predetermined range thereby allowing rapid approach of temperature to said predetermined range and a slower rate of approach towards bridge balance within said predetermined range so as to permit rapid return to desired conditions without overcompensation.

2. In a control circuit, the combination of a source of alternating-current electric power, a source of unmodulated radio-frequency voltage, a modulator to provide an amplitude-modulated radio-frequency current having a carrier frequency and phase determined by said unmodulated radio-frequency voltage and a modulation envelope frequency and phase determined by said alternating current electric power, an alternating-current bridge circuit, connections to energize said bridge circuit with said amplitude modulated radio-frequency current, an amplifier to amplify the unbalance voltage of the bridge circuit to provide a first error voltage of amplitude-modulated radio frequency the carrier phase of which is determined by the direction of bridge unbalance, circuit means to add to said first error voltage an unmodulated radio-frequency voltage having an amplitude greater than the maximum amplitude of the first error voltage to obtain a second error voltage, a demodulator to provide a third error voltage the frequency and phase of which are determined by the modulation envelope of said second error voltage, and circuit means to add to said third error voltage a voltage having a frequency determined by said alternating-current electric power and a phase angle of 90° therewith to obtain a fourth error voltage having a frequency determined by said alternating-current electric power and a phase determined by the degree and direction of unbalance of said bridge circuit.

PHILIP C. MICHEL.
THEODORE A. RICH.

REFERENCES CITED

The following references are of record in the file of this patent:

UNITED STATES PATENTS

| Number | Name | Date |
|---|---|---|
| 2,316,875 | Laboulais | Apr. 20, 1943 |
| 2,410,295 | Kuehni et al. | Oct. 29, 1946 |
| 2,419,266 | Kliever et al. | Apr. 22, 1947 |
| 2,423,864 | Washburn et al. | July 15, 1947 |
| 2,438,288 | Jacobsen et al. | Mar. 23, 1948 |